(12) United States Patent
Bouchard et al.

(10) Patent No.: US 8,204,843 B2
(45) Date of Patent: Jun. 19, 2012

(54) TEMPORAL EVENTS ANALYSIS EMPLOYING TREE INDUCTION

(75) Inventors: Guillaume Bouchard, Crolles (FR); Jean-Marc Andreoli, Meylan (FR)

(73) Assignee: Xerox Corporation, Norwalk, CT (US)

( * ) Notice: Subject to any disclaimer, the term of this patent is extended or adjusted under 35 U.S.C. 154(b) by 715 days.

(21) Appl. No.: 12/330,639

(22) Filed: Dec. 9, 2008

(65) Prior Publication Data

US 2009/0216700 A1 Aug. 27, 2009

Related U.S. Application Data

(63) Continuation-in-part of application No. 12/035,787, filed on Feb. 22, 2008, now abandoned.

(51) Int. Cl.
*G06F 17/00* (2006.01)
*G06N 5/02* (2006.01)

(52) U.S. Cl. ......................................................... 706/46
(58) Field of Classification Search .................... None
See application file for complete search history.

(56) References Cited

U.S. PATENT DOCUMENTS 7,561,991 B2 * 7/2009 Matsunaga et al. ............... 703/2
7,872,593 B1 * 1/2011 Rauscher et al. ............. 340/933

OTHER PUBLICATIONS

Blythe, "An Overview of Planning Under Uncertainty", AI Magazine, 20(2), 1999, number of pages 23.*
Zettlemoyer et al. "Learning Planning Rules in Noisy Stockastic Worlds", AAAI, 2005, pp. 911-918.*
Blythe, J. "An Overview of Planning Under Uncertainty", AI Magazine, 1999, 20 (2), pp. 37-54.
Zettlemoyer, L. "Learning Planning Rules in Noise Stochastic Worlds", AAAI, 2005, pp. 911-918.
Non-Final Office Action from U.S. Appl. No. 12/035,787 dated Mar. 23, 2011.
Das et al., "Rule discovery from time series," American Association for Artificial Intelligence, 1998.
Allen, "Maintaining Knowledge about Temporal Intervals," Communications of the ACM, vol. 26, No. 11, pp. 832-843, 1983.
Dominey et al., "Learning to talk about events from narrated video in a construction grammar framework," Artificial Intelligence 167, pp. 31-61, 2005.
Gold, "Language Identification in the Limit," Academic Press Inc., Information and Control, 10, pp. 447-474, 1967.
Hoppner, "Learning Dependencies in Multivariate Time Series," European Conference on Artificial Intelligence (ECAI), Lyon, France, Jul. 2002.
Kam et al., "Discovering Temporal Patterns for Interval-based Events," Second International Conference on Data Warehousing and Knowledge Discovery, UK, vol. 1874, pp. 317-326, Springer, 2000.

(Continued)

*Primary Examiner* — Jeffrey A Gaffin
*Assistant Examiner* — Li-Wu Chang
(74) *Attorney, Agent, or Firm* — Fay Sharpe LLP

(57) ABSTRACT

An events analysis method comprises: optimizing respective to a set of training data a set of branching transition likelihood parameters associating parent events of type k with child events of type k' in branching processes; inferring a most probable branching process for a set of input data comprising events based on the optimized set of branching transition likelihood parameters; and identifying rare or unusual events of the set of input data based on the inferred most probable branching process. An events analysis apparatus includes a probabilistic branching process learning engine configured to optimize the set of branching transition likelihood parameters, and a probabilistic branching process inference engine configured to infer the most probable branching process.

21 Claims, 2 Drawing Sheets

OTHER PUBLICATIONS

Krishnapuram et al., "A Bayesian Approach to Joint Feature selection and Classifier Design," IEEE Transactions on Pattern Analysis and Machine Intelligence, vol. 26, No. 9, 2004.

Last et al., "Knowledge Discovery in Time Series Databases," IEEE Transactions on Systems, Man, and Cybernetics, 31B, 2001.

Moulin et al., "Analysis of Multiresolution Image Denoising Schemes Using Generalized-Gaussian and Complexity Priors," IEEE Trans. Information Theory, 45:909-919, 1999.

Mannila et al., "Discovery of Frequent Episodes in Event Sequences," Data Mining and Knowledge Discovery, 1 (3):259-289, 1997.

Morchen et al., "Mining Hierarchical Temporal Patterns in Multivariate Time Series," Lecture Notes in Computer Science, pp. 127-140, Springer, 2004.

Saetrom et al., "Unsupervised Temporal Rule Mining with Genetic Programming and Specialized Hardware," Proc. 2003 Int. Conf. Machine Learning and Applications, pp. 145-151, 2003.

Tibshirani, "Regression shrinkage and selection via the lasso," Journal of the Royal Statistical Society Series B, 58:267-288, 1996.

Villafane et al., "Mining Interval Time Series," Data Warehousing and Knowledge Discovery, pp. 318-330, 1999.

Wainwright, "Estimating the 'Wrong' Graphical Model: Benefits in the Computation-Limited Setting," Journal of Machine Learning Research, 7:1829-1859, 2006.

\* cited by examiner

TEMPORAL EVENTS ANALYSIS EMPLOYING TREE INDUCTION

This application is continuation-in-part of application Ser. No. 12/035,787, filed Feb. 22, 2008. Application Ser. No. 12/035,787, filed Feb. 22, 2008 is incorporated herein by reference in its entirety.

BACKGROUND

The following relates to diagnostic, predictive, data mining, and related arts. The following is described with illustrative reference to analysis of printing network logs for use in repair or preventative maintenance, but is useful in analysis of records of temporal events and sequences generally.

Electronic devices such as printers, automobiles, and so forth are complex devices that typically include electronic monitoring. For example, printer networks typically log substantive events such as print job receipt and completion, error codes generated during printing or while the printer is idle, warning messages such as low toner messages, and so forth. If a printer fails or requires service, the technician can access the event logs as an aid to diagnosis of the problem.

As another example, automobiles include on-board computers that monitor and record various automotive systems such as the engine, transmission, exhaust, tire pressure, and so forth. These records are retrieved from the on-board computer using a specialized digital interface, and are utilized by automotive maintenance personnel to diagnose problems reported by the motorist, or by forensic safety personnel to determine the cause of an automobile accident, or so forth.

In these and other applications, a difficulty arises in that the amount of data collected and stored can be overwhelming. Most of the recorded data reflect commonplace events that are not diagnostically useful. The relevant data for diagnostic or forensic applications are typically rare or unusual events.

Accordingly, it is known to provide event analyzers that search for and highlight rare or unusual events in event logs or records. However, these analyzers have certain deficiencies. They can be overinclusive in that they fail to isolate the root event causing the problem under study. Such overinclusiveness can arise because when a problem event occurs, other events which would otherwise be rare or unusual may then have a higher likelihood of occurrence. For example, an automotive stability control system activation event may generally be an unusual event worthy of note. However, if there is low air pressure in one of the tires, then the stability control system may activate more frequently than usual as it attempts to compensate for poor stability caused by the tire with low air pressure. An analysis identifying the stability control system activation events may be overinclusive when the root problem is low tire air pressure as indicated by an earlier low air pressure warning event. The technician encountering numerous stability control system activations output by the analyzer may erroneously conclude that the stability control system is misbehaving, and fail to notice the earlier low tire pressure warning event.

At the same time, event analyzers that flag rare or unusual events can be underinclusive. For example, a print job cancellation event by user "X" of a print job on printer "A" of a printing network log is not, by itself, an unusual event, and is unlikely to be identified by an event analyzer that identifies rare or unusual events. However, a print job cancellation on printer "A" by user "X" that is immediately followed initiation of a print job by the same user "X" on a different printer "B" may be an unusual event, possibly indicative of a problem with printer "A" recognized by user "X".

Sequential approaches, such as Markov algorithms, are also known for use in event analyzers. In these approaches, the analysis searches for and flags rare or unusual event sequences. These approaches can reduce the overinclusiveness or underinclusiveness of isolated event-based analyzers. However, sequential approaches are limited in their ability to recognize complex event relationships, especially when several distinct processes overlap.

BRIEF DESCRIPTION

In some illustrative embodiments disclosed as illustrative examples herein, a events analyzer is disclosed, comprising: a probabilistic branching process learning engine configured to optimize respective to a set of training data a set of branching transition likelihood parameters associating parent events of type k with child events of type k' in branching processes; and a probabilistic branching process inference engine configured to infer a most probable branching process for a set of input data comprising events based on the optimized set of branching transition likelihood parameters.

In some illustrative embodiments disclosed as illustrative examples herein, a computer readable medium or media are disclosed, said computer readable medium or media being encoded with instructions executable on a computer or other digital processing device to perform an events analysis method including (i) inferring a most probable branching process for a set of input data comprising events based on an optimized set of branching transition likelihood parameters and (ii) identifying rare or unusual events based on the inferred most probable branching process.

In some illustrative embodiments disclosed as illustrative examples herein, an events analysis method is disclosed, comprising: optimizing respective to a set of training data a set of branching transition likelihood parameters associating parent events of type k with child events of type k' in branching processes; inferring a most probable branching process for a set of input data comprising events based on the optimized set of branching transition likelihood parameters; and identifying rare or unusual events of the set of input data based on the inferred most probable branching process.

DETAILED DESCRIPTION

It is recognized herein that events occurrences are typically not sufficiently characterized by occurrence frequencies or probabilities alone, since events are often interrelated. Moreover, it is recognized herein that the interrelation of events are typically not sufficiently characterized by sequential models such as Markov chains. This is because the consequence of a rare or unusual event is often not a single result, but rather a cascade of branching events of varying probability level at varying times in the future.

The event analyses disclosed herein use tree induction to infer a branching process that most probably characterizes sets of events. Such analyses are able to capture complex interrelationships amongst events, so as to more readily identify the root cause of a problem evidenced by such events.

Figure 1:
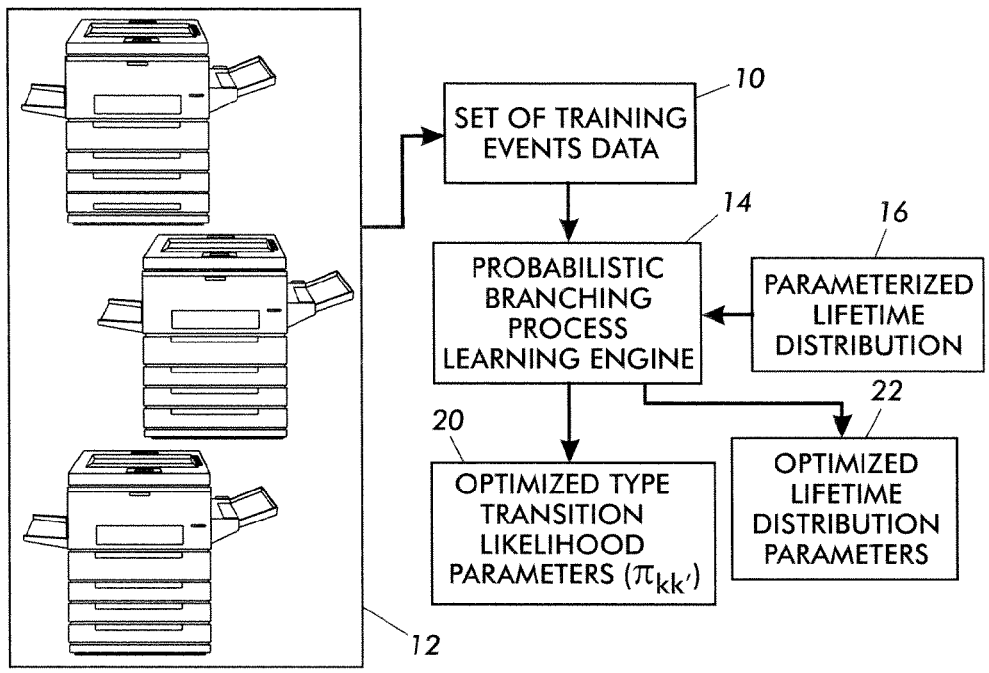
FIG. 1 diagrammatically shows learning components that operate to optimize branching transition likelihood parameters associating parent events of with child events in branching processes.
Figure 2:
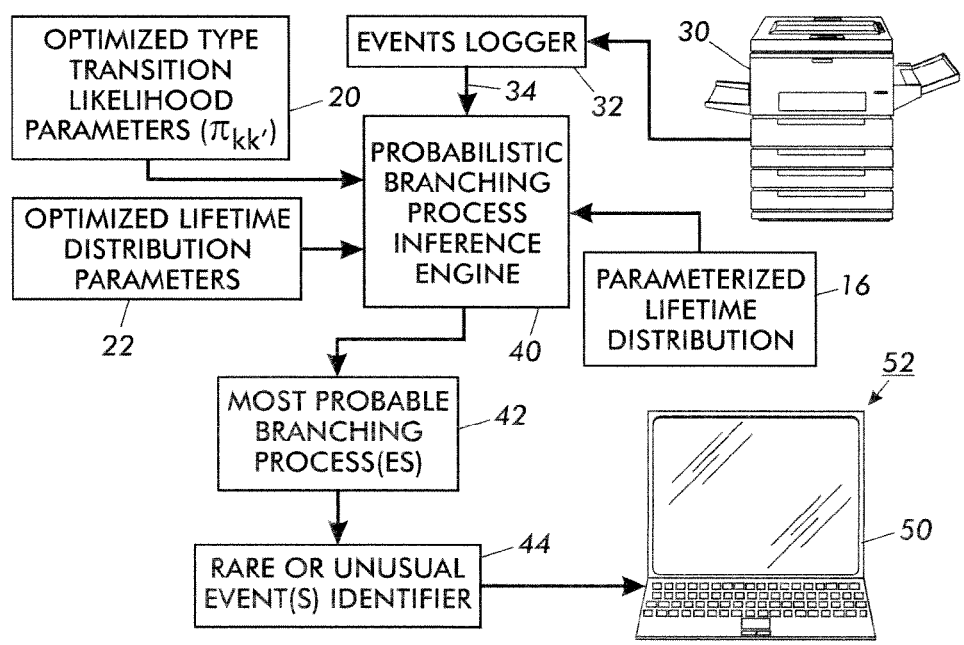
FIG. 2 diagrammatically shows inference and rare or unusual event identification components that operate to infer a most probable branching process interrelating a set of events, and identify rare or unusual events based on the transition likelihoods of the most probable branching process.

With reference to FIGS. 1 and 2, an illustrative tree induction-based events analyzer is described. FIG. 1 illustrates learning components that operate to optimize branching transition likelihood parameters associating parent events of with child events in branching processes. FIG. 2 illustrates inference and rare or unusual event identification components that operate to infer a most probable branching process interrelating a set of events, and identify rare or unusual events based on the transition likelihoods of the most probable branching process.

With reference to FIG. 1, the learning process optimizes the branching transition likelihood parameters respective to a set of training events data 10. The training events data are suitably extracted from one or more devices that are similar to, or the same as, the device to be monitored. In the illustrated embodiment, a plurality of printing devices 12 is monitored to generate a printing network log of events that serves as the set of training events data 10. However, the disclosed events analyses are suitably applied to substantially any type of device that is monitored to record, log, or otherwise store events related to the device or device operations. The set of training events data are in the form of a sequence of recorded events, for example suitably represented by data pairs ($t_n$, $<e_n>$) where $t_n$ denotes a time of occurrence of an event denoted $<e_n>$. The contents of the event recordation $<e_n>$ can take various forms. For example, the event recordation $<e_n>$ may be embodied as an error code output by the monitored device when a sensor or monitoring system detects occurrence of an error corresponding to the error code. The event recordation $<e_n>$ may also take the form of a datum or data representing an operational event, such as a print job recordation including information such as a user identification that identifies the user who initiated the print job, an output machine identifier indicating the marking engine used to execute the print job, characteristics of the print job such as whether it is color or monotone, the print job size measured in pages or another suitable metric, a result code indicating whether the print job was successfully executed, any error codes generated during execution of the print job, or so forth. The set of training events data 10 is chosen to be representative of typical operations of the device or devices to be monitored. For example, in the illustrative example the set of training events data 10 are suitably derived from the plurality of printing devices 12 being used in a functioning office or other production environment.

A probabilistic branching process learning engine 14 is configured to optimize respective to the set of training data 10 a set of branching transition likelihood parameters associating parent events of type k with child events of type k' in branching processes. The learning engine 14 assumes that events have finite lifetimes that can be statistically represented using a parameterized lifetime distribution 16. In some illustrative embodiments disclosed herein, the parameterized lifetime distribution is a log-normal lifetime distribution having as parameters a mean and a precision. As another example, an exponential lifetime distribution is contemplated, having as parameters a mean and a variance or standard deviation. Although the single parameterized lifetime distribution 16 is illustrated, it is contemplated for different event types to have different parameterized lifetime distributions. In the illustrated embodiment, the probabilistic branching process learning engine 14 is configured to optimize branching transition likelihood parameters including: (i) type transition likelihood parameters $\pi_{kk'}$ which are indicative of likelihood that one or more events of type k' triggered by an event of type k; and (ii) one or more lifetime parameters for each event type k indicative of a statistical lifetime of events of type k. In the illustrated embodiment, these latter lifetime parameters are the parameters of the parameterized lifetime distribution 16 for each event type k. Thus, the branching process assumes that an event k occurs, and after a period of time statistically described by the parameterized lifetime distribution 16 with the lifetime parameters for event k one or more child events of type k' (for each such type) occur with probabilities given by the type transition likelihood parameters $\pi_{kk'}$. In some embodiments, the branching process is assumed to be a Poisson branching process. The output of the probabilistic branching process learning engine 14 is the optimized branching transition likelihood parameters which include, in the illustrated embodiment, optimized type transition likelihood parameters 20, and optimized lifetime distribution parameters 22 for each event type k. The optimized type transition likelihood parameters 20 are suitably written in the form $\pi_{kk'}$ where k denotes the parent event type and k' denotes the child event type. It is to be appreciated that k=k' is contemplated—the type transition likelihood parameter $\pi_{kk}$ is indicative of the likelihood that an event of type k triggers other events of the same type k.

The terms "optimize" or "optimized" and the like as used herein do not necessarily denote global optimization or globally optimal values, but rather also encompass approximate optimization algorithms and approximate optimized values, which may differ from global optimum due to early termination of an iterative optimization process, or due to an optimization process settling on a locally optimal value rather than on the globally optimum value, or other factors. Analogous construction applies for terms such as "maximize" or "minimize" and the like, insofar as they are used to describe the optimization process, optimized parameters, or the like.

With reference to FIG. 2, the optimized branching transition likelihood parameters 20, 22 generated by the probabilistic branching process learning engine 14 are used to infer a most probable branching process for a set of input data comprising events. In the illustrative example of FIG. 2, a printing device 30 used in an office or other setting generates events during operation that are recorded by an event logger 32. The printing device 30 may be a member of the plurality of printing devices 12 of FIG. 1 that generated the training data 10, or the printing device 30 may be a different printing device that is sufficiently similar so as to be suitably modeled by the training data 10 generated by the plurality of printing devices 12 of FIG. 1. In a typical application of the inference system of FIG. 2, users of the printing device 30 may have reported a problem with the printing device 30, and a repair person has been dispatched to service the printing device 30. The repair person wishes to analyze a set of input data 34 comprising events logged by the event logger 32 over a time interval likely to encompass the genesis of the underlying cause of the problem reported by the users of the printing device 30. It is to be recognized that the underlying or root cause of the problem may be different from the reported problem. For example, the reported problem may be abnormally high toner usage, but the underlying or root cause of this high toner usage may be a malfunction elsewhere in the printing device 30. Because the underlying or root cause is generally unknown, its time of occurrence is also generally unknown, and so the set of input data 34 to be analyzed is suitably chosen to go back substantially in time to a period substantially before the first indication of a problem reported by users. The set of input data 34 to be analyzed may be substantial, perhaps embodying thousands or more events of various types generated in the course of operation of the printing device 30.

The set of input data 34 to be analyzed is therefore advantageously analyzed in an automated fashion by a probabilistic branching process inference engine 40 which is configured to infer a most probable branching process or processes 42 for the set of input data 34 comprising events. The inference is performed based on the optimized set of branching transition likelihood parameters 20, 22, with the optimized lifetime distribution parameters 22 for each event type k being used in conjunction with the corresponding parameterized lifetime distribution 16 to statistically characterize most probable event lifetimes.

The most probable branching process or processes 42 provide substantial information, including most probable branched interrelationships between events, and branching transition likelihoods for each transition from a parent event k to a child event k'. In most cases, the branching transitions reflect normal operation of the printing device 30 and will have high branching transition likelihoods. However, a malfunction or other unusual event is likely to entail a rare or unusual transition, which will have a correspondingly low branching transition likelihood. Accordingly, a rare or unusual events identifier 44 identifies rare or unusual events based on the most probable branching process or processes 42, for example based on transition likelihoods of the most probable branching process. In some embodiments, the rare or unusual events identifier 44 identifies rare or unusual events as a parent or child event of a branching transition having a low branching transition likelihood.

The resulting analysis is suitably displayed on a display device 50 of a user interface 52. For example, the user interface 52 may be a laptop computer associated with the repair person, and the display device 50 may be the display of the laptop computer. The user interface 52 including the display device 50 can, for example, be configured to display a plot of the set of input data 34 (for example as a function of time) with rare or unusual events identified by the rare or unusual events identifier 44 emphasized in the displayed plot. Such emphasis can be achieved using an emphasis color (e.g., red data point symbols to represent rare or unusual events, black data point symbols to represent other events), an emphasis symbol (e.g., filled data point symbols to represent rare or unusual events and open data point symbols to represent other events), or so forth. Instead of or in addition to displaying the resulting analysis, in some contemplated embodiments the resulting analysis may be input to a control module (not shown) that acts on the analyzed system (e.g., the printing device 30 in FIG. 2) to correct or otherwise redress a problem detected by the analysis.

Figure 3:
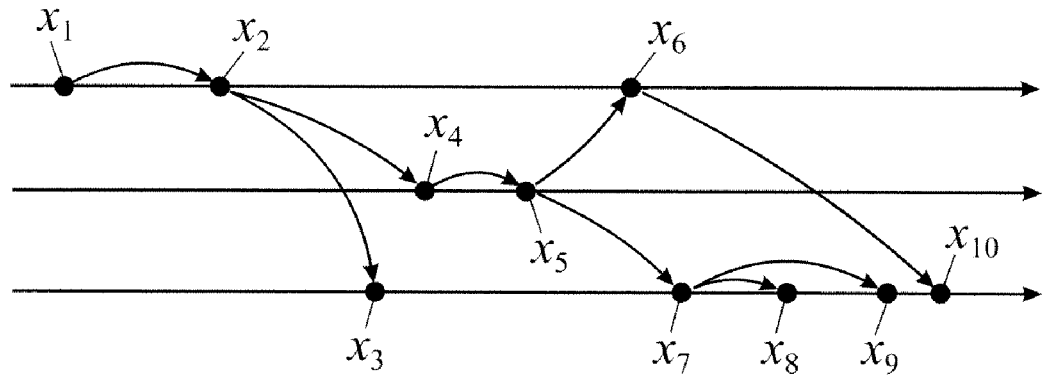
FIGS. 3 and 4 diagrammatically show two different graphical representations of a multi-type branching process.
Figure 4:
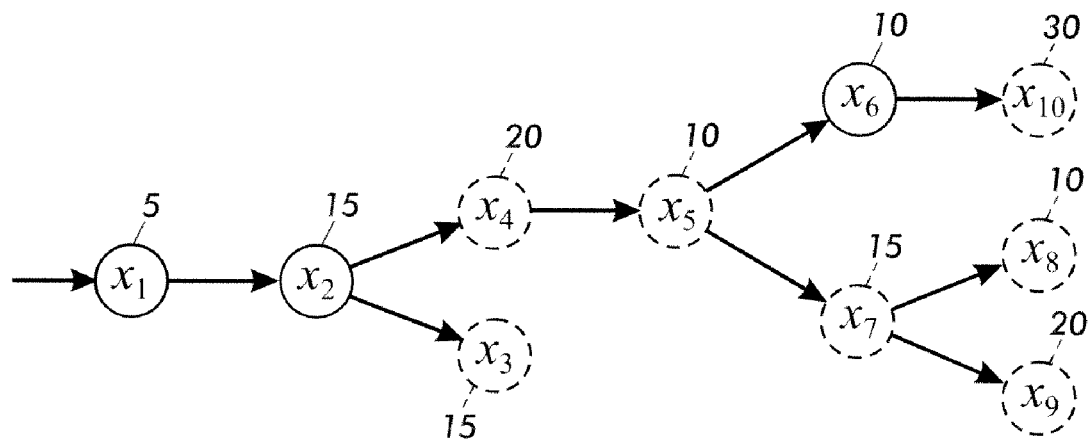

With reference FIGS. 3 and 4, two graphical representations of a branching process are illustrated. In FIG. 3, the horizontal axis corresponds to time and the vertical axis corresponds to event type. Each point symbolically indicates the event type and death time of an event, and simultaneously symbolizes the birth date of any offspring or child events. In FIG. 4, a tree representation of the event genealogy of FIG. 3 is shown. The connecting arrows are labeled with lifetime duration. The line style of the circles denoting the events is coded (i.e., plain, dotted or dashed line type) to indicate the event type.

The various computational components 14, 32, 40, 44 of the events analysis system of FIGS. 1 and 2 can be variously embodied. For example, in some embodiments, a computer, controller, Internet server, personal data assistant (PDA), or other digital device with at least one processor is programmed to implement the components 14, 32, 40, 44, and related operative components. In some embodiments, a computer readable medium or media such as a magnetic disk, magnetic tape, optical disk, random access memory (RAM), read-only memory (ROM), or so forth is or are encoded with instructions that are executable on a computer or other digital processing device to implement the components 14, 32, 40, 44, and related operative components. More generally, the components 14, 32, 40, 44 can be embodied purely as hardware, for example an analog, digital, or mixed application-specific integrated circuit (ASIC), or as a combination of hardware such as a computer or other digital device and software executable on said hardware, or a combination of such systems or subsystems.

Having described some illustrative embodiments with reference to FIGS. 1 and 2, some illustrative examples of the probabilistic branching process learning engine 14, probabilistic branching process inference engine 40, and related components are next described.

In some suitable embodiments, the learning engine 14 takes as input: (i) a list of event sequences (e.g., the training data 10); (ii) lifetime distributions 16 with initially unknown lifetime distribution parameters; and (iii) optionally, a regularization parameter. The optional regularization parameter is useful to suppress overfitting by the model and also controls the sparsity of the solution, that is, the final number of non-discarded rules can depend on the regulation parameter value. The regulation parameter can be automatically tuned by choosing the value that maximizes the probability of hold-out sequences. This is one important advantage of using a probabilistic model: it is often difficult for non-probabilistic approaches to automatically tune the unknown parameters. The learning engine 14 maximizes an objective function and returns the following outputs: (i) the optimized type transition likelihood parameters $\pi_{kk'}$ 20 of distributions for event types enumerated as k=0, ..., K and k'=1, ..., K where K denotes the number of different event types and the distribution is a geometric, Poisson, or other distribution; (ii) the optimized lifetime distribution parameters 22 for the lifetime distributions of the K event types; and (iii) optionally, the optimized value of the objective function (e.g., maximum value for a maximum likelihood formulation of the optimization).

In some suitable embodiments, the inference engine 40 takes as input: (i) a sequence of events (i.e., the set of input data 34 comprising events); (ii) the lifetime distributions for the K event types with the optimized lifetime distribution parameters 22 obtained by the learning engine 14; and (iii) the optimized type transition likelihood parameters $\pi_{kk'}$ 20 obtained by the learning engine 14. The inference engine 40 returns: (i) the log-probability of the sequence 34; and (ii) the probability that an event i in the sequence 34 is the parent of another event j in the sequence 34 for i=0, ..., n and j=1, ..., n where n is the number of events in the input data 34.

Some assumptions are optionally made to facilitate tree induction. In some embodiments, the branching is assumed to follow a geometrical distribution. On other embodiments, the branching is assumed to follow a Poisson distribution. Other types of distributions are also contemplated. Given that an event of type k occurs at a given time, then for each type k', N child events are generated of type k' where N is a random variable following a geometric, Poisson, or other selected distribution with parameter $\pi_{kk'}$ 20. Every child event (if any) is assumed to occur after its parent at a random time sampled from a distribution $Q_{k'}$, where $Q_1, \ldots, Q_K$ are lifetime distributions (which may, for example, be exponential, gamma, Weibull or log-normal distributions) set forth by the parameterized lifetime distribution 16 with corresponding distribution parameters 22. The branching tree is suitably initiated by having a root that generates N children of type k where N is a random variable following a geometric, Poisson, or other selected distribution with parameters $\pi_{0k}$. Every child (if any) occurs at a random time sampled from the distribution $Q_k$. For K event types there are K(K+1) possible type transition parameters of the form $\pi_{kk'}$. However, in practice many type transitions never occur in the representative training data 10. For example, in a printing device it may be that a "toner low" event is almost never triggered by a "toner empty" event. Such non-occurring transitions are suitably set to zero or ignored by the learning engine 14, so that the number of type transitions processed by the inference engine 40 is typically substantially less than K(K+1).

In the following examples, of interest is a class of processes, called free processes, in which the process at time u first generates the offspring types for each event of type s occurring at time u independently according to a distribution $P_s$, then generates for each offspring of type s' its lifetime, also independently, according to a distribution $Q_{s'}$. Of interest is the case where the offspring distribution for any type is multidimensional geometric or Poisson, as these distributions enable a decomposable formulation of the likelihood. For a geometrical distribution, the decomposable formulation is:

$$\forall N \in N^S \ \forall s \in S \ P_s(N) = \prod_{s' \in S} (1 - \pi_{ss'}) \pi_{ss'}^{N_{s'}}, \quad (1a)$$

where S is the set of event types and $\pi_{ss'}$ are the parameters of the geometric distribution (or rather $1-(1-\pi_{ss'})$ are). For the Poisson distribution the decomposable formulation of the likelihood is:

$$\forall N \in N^S \ \forall s \in S \ P_s(N) = \prod_{s' \in S} \frac{\pi_{ss'}^{N_{s'}}}{N_{s'}!}, \quad (1b)$$

where S is the set of event types and $\pi_{ss'}$ are the parameters of the Poisson distribution. It is tedious but not difficult to compute the likelihood that is suitably used by the probabilistic branching process learning engine 14 to optimize respective to the set of training data 10 the set of branching transition likelihood parameters 20, 22 associating parent events of type k with child events of type k' in branching processes. One approach for optimizing the likelihood is as follows. Let S={1, . . . , K} be the set of types and $N_k$ the number of observed events of event type k. Let $\theta=(\pi,\tau)$ be the set of branching transition parameters 20, 22 to be estimated, where $\tau=(\tau_1, \ldots, \tau_K)$ is the vector of parameters for the lifetime probabilities $\{Q_i, i=1, \ldots, K\}$. In the case of a Poisson distribution, the likelihood can be rewritten as:

$$L = \prod_{k=1}^{K} \left\{ \prod_{k'=1}^{K} e^{-N_{k'}\pi_{k'k}} \prod_{\{i,s_i=k\}} \sum_{k'=0}^{K} \pi_{k'k} \sum_{\{j,t_j<t_i,s_j=k'\}} Q_k(t_i - t_j | \tau) \right\}. \quad (2)$$

In the case of a Geometric distribution, there is no simple expression for the likelihood and some approximate inference technique must be used.

The set of branching transition likelihood parameters θ 20, 22 are suitably learned in an unsupervised manner by maximizing the posterior distribution of the parameters given the observations. Assuming R time series $\{x^{(1)}, \ldots, x^{(R)}\}$ have been observed, θ is chosen by maximizing the fit to the data:

$$\hat{\theta} = \quad (3)$$

$$\underset{\theta}{\operatorname{argmax}}\{\log(p(\theta | x^{(1)}, \ldots, x^{(R)}))\} = \underset{\theta}{\operatorname{argmax}} \sum_{r=1}^{R} \log p(x^{(r)} | \theta) + \log p(\theta).$$

For each individual x, the objective function can be written as the sum of independent functions:

$$\log p(x^{(r)} | \theta) = \sum_{l=1}^{K} f_l(\pi_l, \tau_l), \quad (4)$$

where, in the case of a geometric distribution, the function $f_l(\pi_l,\tau_l)$ can be written as:

$$f_l(\pi_l, \tau_l) = \quad (5a)$$

$$\sum_{k=1}^{K} N_k \log(1 - \pi_{kl}) + \sum_{\{i,s_i=l\}} \log \sum_{k=1}^{K} \pi_{kl} v_{ikl} + \log p(\pi_l) + \log p(\tau_l),$$

While in the case of a Poisson distribution, the function $f_l(\pi_l, \tau_l)$ can be written as:

$$f_l(\pi_l, \tau_l) = -\sum_{k=1}^{K} N_k \pi_{kl} + \sum_{\{i,s_i=l\}} \log \sum_{k=1}^{K} \pi_{kl} v_{ikl} + \log p(\pi_l) + \log p(\tau_l), \quad (5b)$$

where, for either distribution:

$$v_{ikl} = \sum_{\{i' \neq i, s_{i'}=k\}} Q_l(t_i - t_{i'} | \tau_l). \quad (6)$$

Choosing a Laplace prior $\log p(\pi_l)\Sigma_{k=1}^{K}\lambda|\pi_{lk}|$ leads to sparse solutions, that is, some parameter values at the maximum of the objective are exactly 0. This is of interest in the context of grammar learning: any value $\pi_{kl}$ that is equal to zeros means that the type k cannot generate the type l. In other words, the rule "k generates l" is discarded from the dictionary (which contains a priori $K^2$ rules).

The functions $f_l$ are convex. In the case of a Poisson distribution, a suitable approach for finding the maximum of the convex functions $f_l:\pi_l \to \Re$ with Laplace priors is as follows. Consider the minimization of the function $h(\pi)$:

$$h(x) = -\sum_{k=1}^{K} N_k x_k + \sum_{i=1}^{n} \log \sum_{k=1}^{K} x_k v_{ik} + \lambda \sum_{k=1}^{K} x_k. \quad (7)$$

The components of its gradient are:

$$\nabla_{x_k} h(x) = \frac{N_k}{1-x_k} - \sum_{i=1}^{n} \frac{v_{ik}}{S_i} + \lambda, \quad (8)$$

where $S_i = \sum_{k'=1}^{K} x_{k'} v_{ik'}$. The components of the Hessian are:

$$\nabla^2_{x_k} h(x) = \frac{N_k}{(1-x_k)^2} + \sum_{i=1}^{n} \frac{v_{ik}^2}{S_i^2}, \quad (9)$$

If it is assumed that every component $x_k$ lies in the interval $[0;b_k]$ where $b_k > 0$ is an arbitrary upper bound, then the diagonal elements of the Hessian can be bounded as follows:

$$\nabla^2_{x_k} h(x) \le \frac{N_k}{(1-b_k)^2} + \sum_{i=1}^{n} \frac{v_{ik}^2}{(S_i - x_{ik} v_{ik})^2} := u_k(x), \quad (10)$$

So the componentwise update:

$$x_k^{(new)} \leftarrow \frac{\nabla_{x_k} h(x)}{u_k(x)}, \quad (11)$$

is guaranteed to decrease the objective function at each iteration if $x_k^{(new)} \le b_k$. Otherwise, the upper bound is suitably increased: $b_k^{(new)} \leftarrow 1 - \alpha(1-b_k)$ where $\alpha \in ]0;1[$ is a predefined constant.

Using a convex objective function advantageously facilitates good generalization performance. To learn the parameters $\tau_l$, $l=1,\ldots,K$, various approaches can be used, such as a grid of parameters approach in which $f_l$ is maximized for a given set of parameter values $\tau_l$, (for example, suitably chosen on a uniform grid of values), or an expectation maximization (EM) algorithm. In some approaches, the functions $f_l$ are iteratively lower bounded using a Jensen inequality and this lower bound is maximized. This is equivalent to the EM algorithm where the hidden variables are the indices of the parents. Numerical trials suggest that the EM algorithm is faster than the grid approach, especially for lifetime distributions with more than one parameter, although both the EM algorithm and the grid approach, as well as other optimization algorithms, are contemplated for use in the probabilistic branching process learning engine 14.

Having described some learning algorithms as illustrative examples, and having described the events analysis system with reference to FIGS. 1 and 2, some actually performed event analyses are now described. These analyses apply the tree induction based events analysis techniques disclosed herein to sequences of events having five different event types. The sequences are all implicitly prefixed with initial events of type 0 which is additional to the five different event types. The event type 0 is used only as a prefix. The illustrative sequences are as follows (omitting the implicit prefix of event type 0):

| Sequence 1 | Type | 1 | 2 | 3 | 4 | 5 |
|---|---|---|---|---|---|---|
| | Date | 1.0 | 4.0 | 9.0 | 16.0 | 32.0 |
| Sequence 2 | Type | 1 | 2 | 3 | 5 | 4 |
| | Date | 1.0 | 4.0 | 9.0 | 16.0 | 32.0 |
| Sequence 3 | Type | 1 | 2 | 4 | 3 | 5 |
| | Date | 1.0 | 4.0 | 9.0 | 16.0 | 32.0 |
| Sequence 4 | Type | 1 | 2 | 4 | 5 | 3 |
| | Date | 1.0 | 4.0 | 9.0 | 16.0 | 32.0 |
| Sequence 5 | Type | 1 | 2 | 5 | 3 | 4 |
| | Date | 1.0 | 4.0 | 9.0 | 16.0 | 32.0 |
| Sequence 6 | Type | 1 | 2 | 5 | 4 | 3 |
| | Date | 1.0 | 4.0 | 9.0 | 16.0 | 32.0 |
| Sequence 7 | Type | 1 | 2 | 1 | 1 | 2 |
| | Date | 1.0 | 4.0 | 9.0 | 16.0 | 32.0 |
| Sequence 8 | Type | 1 | 1 | | | |
| | Date | 1.0 | 4.0 | | | |

Hence, the learned parameters for these types should be the same. The learned parameters of the Poisson law $\pi_{kk'}$ and the parameters of the lifetime distribution (log-normal) are given in Tables 1 and 2, respectively.

TABLE 1 parameters of the Poisson law $\pi_{kk'}$

| | Poisson distribution parameters | | | | |
|---|---|---|---|---|---|
| type | 1 | 2 | 3 | 4 | 5 |
| 0 | 0.5809 | 0.2453 | 0.0323 | 0.0323 | 0.0323 |
| 1 | 0.0707 | 0.3104 | 0 | 0 | 0 |
| 2 | 0 | 0 | 0.3204 | 0.3204 | 0.3204 |
| 3 | 0 | 0 | 0 | 0.1404 | 0.1404 |
| 4 | 0 | 0 | 0.1404 | 0 | 0.1405 |
| 5 | 0 | 0 | 0.1405 | 0.1405 | 0 |

TABLE 2 parameters of the lifetime distribution (log-normal)

| | log-normal parameters | |
|---|---|---|
| type | mean | precision |
| 1 | 1.4132 | 0.3535 |
| 2 | 2.4513 | 0.3399 |
| 3 | 3.3151 | 0.3282 |
| 4 | 3.3151 | 0.3282 |
| 5 | 3.3151 | 0.3282 |

It is seen in Table 1 that some parameters are exactly 0, meaning that the corresponding rule has been discarded. The inference procedure has been applied to the previous sequences. It is found that the types 3, 4 and 5 are likely to be generated by an event of type 2 as indicated by the Poisson distribution having large parameter $\pi_{23} = \pi_{24} = \pi_{25} = 0.3204$ and the most probable parsing returns a branching from state 2 to states 3, 4 and 5. Concerning the lifetime parameters, the events of type 2 have a smaller lifetime than events of type 3, 4 and 5 since they often occur just after events of type 1.

Another events analysis was performed on printer events logs. The tree induction events analysis method was applied to events logs coming from production printers (Nuvera printers available from Xerox Corporation, Norwalk, Conn., U.S.A.) from which events logs are collected. The 20 most frequent events were extracted on 50 devices over a 6-months period of time. Then, the logs were split into day-length sequences. There were approximately 500 events per day on average, with a maximum of 2000 events per day. Less than 1% of days over the 6-month period had more than 2000 log events—these days were removed prior to the tree induction based events analysis. The learning algorithm was applied using the exponential distribution as the lifetime distribution, and took about two hours to learn the grammar.

This demonstrates the feasibility of learning the branching transition likelihood parameters associating parent events of type k with child events of type k' in branching processes at the same printing installation as where the inference engine 40 is applied. Such learning can be updated occasionally, for example every six months, to ensure that the learned branching transition likelihood parameters are relatively current. When a printing machine malfunctions, the technician applies the inference engine 40 using the most recently learned stored parameters in order to aid in diagnosing the printer problem.

In other embodiments, the learning may be performed using test bed machines different from those on which the inference engine 40 is to be applied, so as to generate the branching transition likelihood parameters that can be stored on a storage medium. Then, in order to diagnose a printing machine in the field, the technician applies the inference engine 40 using parameters retrieved from a website or other storage medium, preferably utilizing stored parameters for a printing device most like the printing device undergoing diagnosis in the field.

While analysis of printing device logs is described herein as an illustrative example application, the event analyses disclosed herein are generally applicable to any sort of device log analysis, in which the device generates a large number of temporal events that are not readily manually analyzed. The tree induction analysis relates every event with at most one parent. The most informative events are typically the parent/child pairs which have a low probability.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An events analyzer comprising:
   a probabilistic branching process learning engine comprising a computer programmed to optimize respective to a set of training data a set of branching transition likelihood parameters associating parent events of type k with child events of type k' in branching processes wherein the set of branching transition likelihood parameters include:
   (i) type transition likelihood parameters indicative of likelihood that one or more events of type k' follow an event of type k, and
   (ii) one or more lifetime parameters for each event type k indicative of a statistical lifetime of events of type k; and
   a probabilistic branching process inference engine comprising a computer programmed to infer a most probable branching process for a set of input data comprising events based on the optimized set of branching transition likelihood parameters.

2. The events analyzer as set forth in claim 1, wherein the probabilistic branching process learning engine models branching as a Poisson process.

3. The events analyzer as set forth in claim 2, wherein the probabilistic branching process learning engine applies a maximum likelihood algorithm to optimize respective to the set of training data at least one of (i) the type transition likelihood parameters and (ii) the lifetime parameters.

4. The events analyzer as set forth in claim 1, wherein the probabilistic branching process learning engine applies a maximum likelihood algorithm to optimize the branching transition likelihood parameters respective to the set of training data.

5. The events analyzer as set forth in claim 1, wherein the type transition likelihood parameters are Poisson distribution parameters.

6. The events analyzer as set forth in claim 1, further comprising:
   a rare or unusual events identifier comprising a computer programmed to identify rare or unusual events based on transition likelihoods of the most probable branching process.

7. The events analyzer as set forth in claim 6, further comprising:
   a user interface including a display device configured to display a plot of the set of input data with rare or unusual events emphasized in the displayed plot.

8. The events analyzer as set forth in claim 6, further comprising:
   an events logger comprising a computer programmed to receive and log events associated with a monitored device, the set of input data comprising events comprising at least a portion of the events logged by the events logger.

9. The events analyzer as set forth in claim 8, wherein the events logger is configured to receive and log events associated with one or more printing devices.

10. A non-transitory computer readable medium or media encoded with instructions executable on a computer or other digital processing device to perform an events analysis method including (1) inferring a most probable branching process for a set of input data comprising events based on an optimized set of branching transition likelihood parameters and (2) identifying rare or unusual events based on the inferred most probable branching process, wherein the set of optimized branching transition likelihood parameters include:
    (i) type transition likelihood parameters indicative of likelihood that one or more events of type k' follow an event of type k, and
    (ii) one or more lifetime parameters for each event type k indicative of a statistical lifetime of events of type k.

11. The non-transitory computer readable medium or media as set forth in claim 10, wherein the identifying includes identifying rare or unusual events based on transition likelihoods of the most probable branching process.

12. The non-transitory computer readable medium or media as set forth in claim 10, wherein the encoded events analysis method further includes displaying a plot of the set of input data with rare or unusual events emphasized in the displayed plot.

13. The non-transitory computer readable medium or media as set forth in claim 10, wherein the encoded events analysis method further includes receiving and logging events, the set of input data comprising at least a portion of the logged events.

14. The non-transitory computer readable medium or media as set forth in claim 10, wherein the encoded events analysis method further includes receiving and logging events from one or more printing devices, the set of input data comprising at least a portion of the logged printing device events.

15. An events analysis method comprising:
    optimizing respective to a set of training data a set of branching transition likelihood parameters associating parent events of type k with child events of type k' in branching processes, wherein the set of branching transition likelihood parameters include:
(i) type transition likelihood parameters indicative of likelihood that one or more events of type k' follow an event of type k, and
(ii) one or more lifetime parameters for each event type k indicative of a statistical lifetime of events, of type k;

inferring a most probable branching process for a set of input data comprising events based on the optimized set of branching transition likelihood parameters; and identifying rare or unusual events of the set of input data based on the inferred most probable branching process;

wherein the optimizing, the inferring, and the identifying are performed by a digital device including a processor.

16. The events analysis method as set forth in claim 15, wherein set of the input data is different from the set of training data.

17. The events analysis method as set forth in claim 15, wherein the optimizing comprises:

applying a maximum likelihood algorithm to optimize respective to the set of training data at least one of (i) the type transition likelihood parameters and (ii) the lifetime parameters.

18. The events analysis method as set forth in claim 15, wherein the optimizing comprises:

applying a maximum likelihood algorithm to optimize the branching transition likelihood parameters respective to the set of training data.

19. The events analysis method as set forth in claim 15, wherein the identifying comprises:

identifying rare or unusual events based on transition likelihoods of the most probable branching process.

20. The events analysis method as set forth in claim 15, further comprising:

displaying a plot of the set of input data with rare or unusual events emphasized in the displayed plot.

21. The events analyzer analysis method as set forth in claim 15, further comprising:

receiving the set of input data comprising events from one or more printing devices.

\* \* \* \* \*